United States Patent
Imamura et al.

(10) Patent No.: US 8,982,756 B2
(45) Date of Patent: Mar. 17, 2015

(54) INTERMITTENT RECEPTION CONTROL APPARATUS, COMPUTER-READABLE RECORDING MEDIUM, AND INTERMITTENT RECEPTION CONTROL METHOD

(71) Applicant: Fujitsu Limited, Kawasaki-shi (JP)

(72) Inventors: Toru Imamura, Yokohama (JP);
Kiyoshi Miyazawa, Yokohama (JP);
Yoshiyuki Oota, Yokohama (JP);
Syuuichi Okada, Kawasaki (JP);
Hiroaki Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 13/745,156

(22) Filed: Jan. 18, 2013

(65) Prior Publication Data

US 2013/0258924 A1    Oct. 3, 2013

(30) Foreign Application Priority Data

Mar. 30, 2012    (JP) .................. 2012-083274

(51) Int. Cl.
*G08C 17/00*    (2006.01)
*H04W 76/04*    (2009.01)

(52) U.S. Cl.
CPC .................. *H04W 76/048* (2013.01)
USPC .......................... 370/311; 370/318

(58) Field of Classification Search
USPC ........................................... 370/311
See application file for complete search history.

(56) References Cited

U.S. PATENT DOCUMENTS 6,959,013 B1 * 10/2005 Muller et al. .................. 370/512
8,223,681 B2    7/2012 Oguchi

FOREIGN PATENT DOCUMENTS

JP    2002-158609    5/2002
JP    2010-016636    1/2010

* cited by examiner

*Primary Examiner* — Sai-Ming Chan
(74) *Attorney, Agent, or Firm* — Fujitsu Patent Center

(57) ABSTRACT

An intermittent reception control apparatus controls intermittent reception in communication between a base station apparatus and mobile station apparatuses. The intermittent reception control apparatus comprising a control unit that generates DRX parameters, which are intermittent reception parameters, and transmits the generated DRX parameters to the mobile station apparatuses. Further, the DRX parameters include information on the timing at which to cause the mobile station apparatuses to enter an active state and are common to all of the mobile station apparatuses, where the active state is a state where reception of signals transmitted from the base station apparatus is enabled. The intermittent reception control apparatus further comprising a scheduler that transmits to the mobile station apparatuses a DRX command that operates to force these apparatuses to enter an inactive state.

7 Claims, 13 Drawing Sheets

INTERMITTENT RECEPTION CONTROL APPARATUS, COMPUTER-READABLE RECORDING MEDIUM, AND INTERMITTENT RECEPTION CONTROL METHOD

CROSS-REFERENCE TO RELATED APPLICATION

This application is based upon and claims the benefit of priority of the prior Japanese Patent Application No. 2012-083274, filed on Mar. 30, 2012, the entire contents of which are incorporated herein by reference.

FIELD

The embodiments discussed herein are directed to an intermittent reception control apparatus, an intermittent reception control program, and an intermittent reception control method.

BACKGROUND

LTE (Long Term Evolution) defines a scheme based on OFDM (Orthogonal Frequency Division Multiplex) as a radio access technology. LTE (Long Term Evolution) thus enables high-speed wireless packet communication at the downlink peak data rate of at least 100 Mbps and the uplink peak data rate of at least 50 Mbps. Further, 3GPP (3rd Generation Partnership Project), which is an international standardization group, has already started studying an LTE-based mobile communication system, LTE-A (LTE-Advanced), in its efforts to bring about even faster communication.

In using LTE or LTE-A, DRX (Discontinuous Reception) is adopted as a method for implementing a power-saving mode of a mobile station in some cases.

DRX is specifically described here. For a mobile station, a first interval that involves monitoring of a PDCCH (Physical Downlink Data Channel), and a second interval that does not involve the monitoring are set. Note that a PDCCH is an L1 signal, which is a Layer 1 signal, and is used for controlling data transmission and reception. In addition, the first interval and the second interval are set so as to occur cyclically, and a cycle corresponding to, as a unit interval, one pair of the first interval and the second interval is called a "DRX cycle". This "DRX cycle" is set with respect to each mobile station uniquely thereto, not with respect to each application. The first interval may be called "On Duration" in some cases.

In an interval that does not require monitoring of the PDCCH, the mobile station does not need to perform signal processing such as data reception processing, and is therefore allowed to enter the power-saving mode. In the power-saving mode, the mobile station stops, for example, signal processing in a baseband unit.

The DRX cycle is set, at the start of communication, when a base station notifies the mobile station of DRX parameters and the like. An RRC (Radio Resource Control) signal, which is an L3 signal, is used for this notification. Specifically, the mobile station receives the RRC signal, and sets DRX in accordance with DRX parameters contained in the RRC signal. The DRX parameters include, for example, long DRX-Cycle, drx Start Offset, On Duration Timer, and drx-Inactivity Timer, where:

long DRX-Cycle is a parameter that defines a length of the DRX cycle;

drx Start Offset is a parameter that defines the start of the DRX cycle;

On Duration Timer is a parameter that defines a length of the first interval of the DRX cycle; and drx-Inactivity Timer is a parameter that defines the timing at which to enter an inactive state, and is reset each time when data transmission or reception is performed during On Duration. When a time period set in this drx-Inactivity Timer parameter is up, the inactive state is entered.

Note that it is allowed to set a DRX cycle that is shorter than the DRX cycle set by long DRX-Cycle. When such a DRX cycle is set, the DRX parameters may include drx Short Cycle Timer and short DRX-Cycle, where: short DRX-Cycle corresponds to long DRX-Cycle; and drx Short Cycle Timer corresponds to On Duration Timer.

Here, it is basically not allowed to enter the inactive state under the condition that time has not yet been up on both of On Duration Timer and drx-Inactivity Timer. That is, under the condition that time has been up on both of On Duration Timer and drx-Inactivity Timer, the mobile station is allowed to enter the power-saving mode.

On the other hand, under the control of the base station, there are multiple mobile stations controlled thereby. The timing at which to enter the inactive state is different by mobile station, and therefore, the base station has a possibility of transmitting or receiving data to or from a mobile station at any time, and has a difficulty in entering the power-saving mode.

With regard to this problem, there is a conventional technology that causes a base station to enter the power-saving mode by causing each controlled mobile station to enter an idle state. Here, an idle state means a state where the mobile station is allowed only to receive broadcast information from the base station.

Patent Document 1: Japanese Laid-open Patent Publication No. 2002-158609

However, the above conventional technology does not allow a base station to enter the power-saving mode when only one of multiple mobile stations controlled thereby is in an idle state, i.e., has been enabled to transmit and receive data to and from the base station. Therefore, the technology is not very effective in saving power.

SUMMARY

According to an aspect of an embodiment, an intermittent reception control apparatus, which controls intermittent reception in communication between a first communication apparatus and a plurality of communication apparatuses, the intermittent reception control apparatus: includes a control unit that generates intermittent reception parameters and transmits the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and a scheduler that schedules data signals to be transmitted and received to and from the plurality of communication apparatuses that are in an active state, and transmits to the plurality of communication apparatuses a control signal that operates to force the plurality of communication apparatuses to enter an inactive state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that these embodiments are not intended to limit the intermittent reception control apparatus, the intermittent reception control program, and the intermittent reception control method that are disclosed in the present application. Additionally, constituent elements having the same functions are denoted by the same reference signs, and redundant explanations are omitted.

[a] First Embodiment

Configuration of Base Station Apparatus 10

Figure 1:
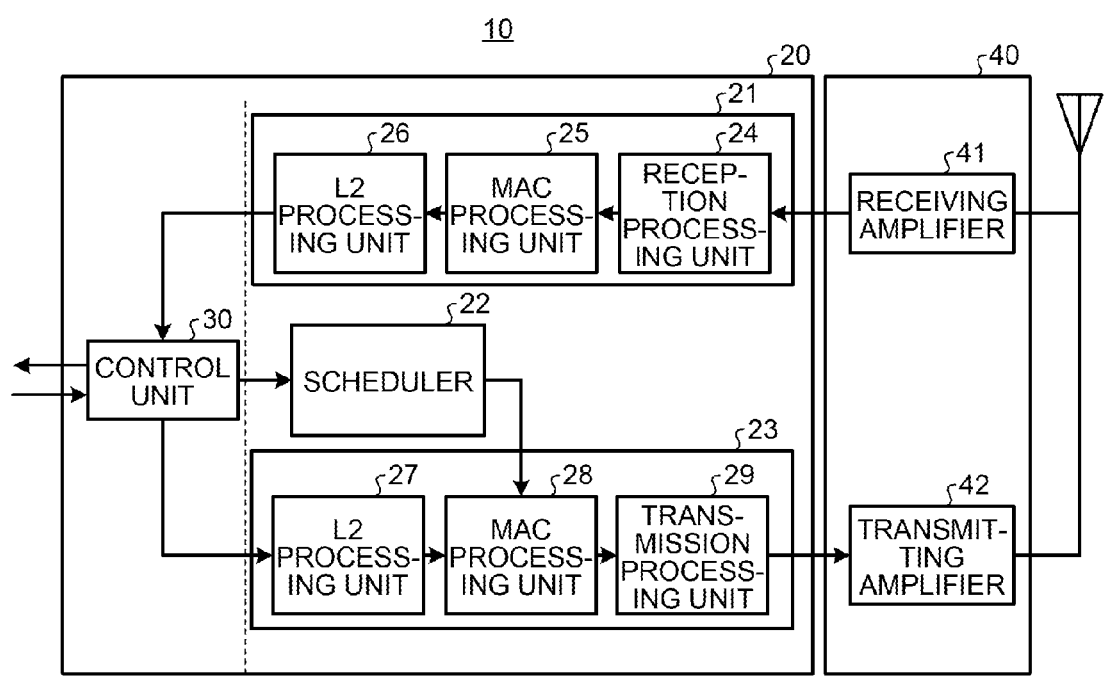
FIG. 1 is a block diagram illustrating one example of a base station apparatus according to a first embodiment.

FIG. 1 is a block diagram illustrating one example of a base station apparatus according to a first embodiment. In FIG. 1, a base station apparatus 10 includes an intermittent reception control apparatus 20, and a radio apparatus 40.

The intermittent reception control apparatus 20 includes a received-signal processing unit 21, a scheduler 22, a transmitter-signal processing unit 23 and a control unit 30. Here, the received-signal processing unit 21, the scheduler 22, and the transmitter-signal processing unit 23 are included in a baseband unit.

The received-signal processing unit 21 performs reception processing on a signal transmitted from a mobile station located within the cell of the base station apparatus 10 and received via the radio apparatus 40, and then outputs the signal to the control unit 30.

Specifically, the received-signal processing unit 21 includes a reception processing unit 24, an MAC processing unit 25, and an L2 processing unit 26.

The reception processing unit 24 performs demodulation processing and decoding processing on the signal received via the radio apparatus 40, and outputs received data thus obtained to the MAC processing unit 25.

The MAC processing unit 25 performs MAC layer processing on the received data and outputs to the L2 processing unit 26 the received data that has gone through the MAC layer processing.

The L2 processing unit 26 performs L2 processing on the received data that has thus gone through the MAC layer processing, and outputs to the control unit 30 the received data that has thus gone through the L2 processing. The L2 processing includes RLC layer processing or PDCP layer processing.

When a condition for power-saving operation is satisfied, the control unit 30 inputs a power-saving operation instruction to the scheduler 22. The condition for power-saving operation is, for example, that an instruction has been received from an upper network, or that a traffic volume detected is less than a predetermined threshold. The control unit 30 has the function of monitoring traffic amount between the base station apparatus 10 and each mobile station.

Additionally, the control unit 30 determines DRX parameters, and outputs to the transmitter-signal processing unit 23 an RRC message that contains the DRX parameters. The RRC message thus containing the DRX parameters is transmitted via the transmitter-signal processing unit 23 and the radio apparatus 40 to a mobile station apparatus 50. Here, the DRX parameters include long DRX-Cycle, drx Start Offset and On Duration Timer. Here, a state where the base station apparatus 10 and the mobile station apparatus 50 share the same DRX parameters, namely, an RRC connected state, is a state where data transmission and reception is enabled between the base station apparatus 10 and the mobile station apparatus 50. This state is distinguished from an idle state.

Here, when a condition for power-saving operation is satisfied, the control unit 30 sets each of the DRX parameters for all of mobile stations controlled thereby to the same value. The timing at which to start On Duration is thereby set to the same time point for all of the controlled mobile stations.

Further, the control unit 30 outputs a power-saving instruction to the scheduler 22 to perform control for forcing all of the controlled mobile stations to enter an inactive state, and thereafter, causes the base station apparatus 10 to enter the power-saving mode.

The scheduler 22 schedules data transmission and reception for data to be transmitted to and received from each mobile station that is in an active state. Further, upon receiving the power-saving instruction, the scheduler 22 performs control for transmitting a DRX command to all of the controlled mobile stations. Specifically, upon receiving the power-saving instruction, the scheduler 22 outputs an issuing instruction to a MAC processing unit 28 described later. Accordingly, the MAC processing unit 28 issues the DRX command addressed to all of the controlled mobile stations.

Here, the DRX command is a control signal that functions to cause all of the controlled mobile stations to enter the inactive state.

The transmitter-signal processing unit 23 performs signal processing on data or control information to be transmitted to a mobile station, and then transmits the data or control information thereto via the radio apparatus 40.

Specifically, the transmitter-signal processing unit 23 includes an L2 processing unit 27, the MAC processing unit 28, and a transmission processing unit 29.

The L2 processing unit 27 performs L2 processing on inputted data to be transmitted, and then outputs to the MAC processing unit 28 the data to be transmitted that has thus gone through the L2 processing. The L2 processing includes RLC layer processing or PDCP layer processing.

The MAC processing unit 28 performs MAC layer processing on the data to be transmitted that has thus gone through the L2 processing, and then outputs to the transmission processing unit 29 the data to be transmitted that has thus gone through the MAC processing. Further, upon receiving the issuing instruction from the scheduler 22, the MAC processing unit 28 issues the DRX command addressed to all of the controlled mobile stations, and outputs the command to the transmission processing unit 29.

The transmission processing unit 29 performs coding processing and modulation processing on the data to be transmitted that has gone through the MAC layer processing, and transmits a thereby obtained signal via the radio apparatus 40.

The radio apparatus 40 outputs to the intermittent reception control apparatus 20 a signal received via an antenna, and transmits via the antenna a signal received from the intermittent reception control apparatus 20.

Specifically, the radio apparatus 40 includes a receiving amplifier 41 and a transmitting amplifier 42. Further, the receiving amplifier 41 amplifies a signal received via the antenna, and then outputs the signal to the intermittent reception control apparatus 20. On the other hand, the transmitting amplifier 42 amplifies a signal received from the intermittent reception control apparatus 20, and then outputs the signal via the antenna.

Configuration of Mobile Station Apparatus 50

Figure 2:
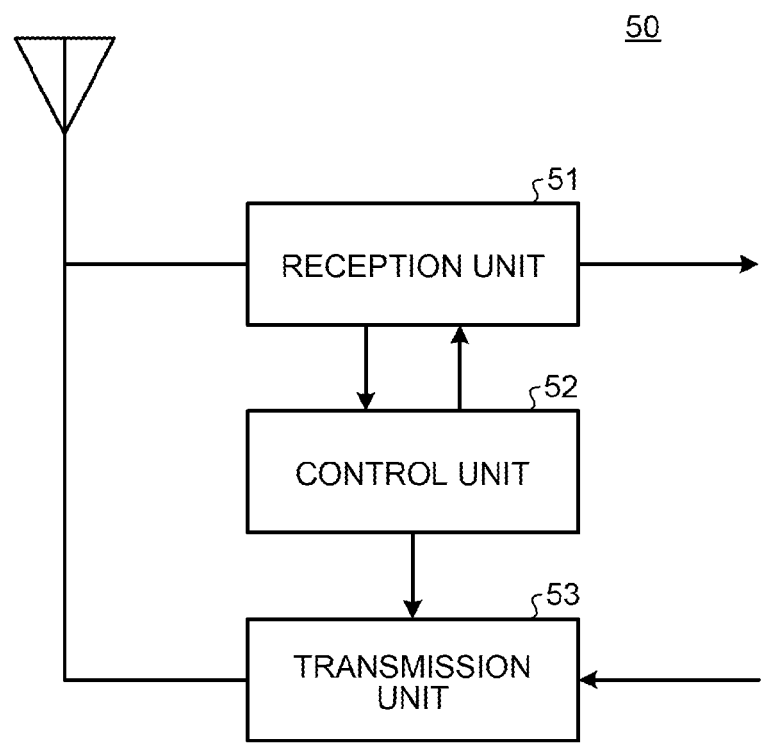
FIG. 2 is a block diagram illustrating one example of a mobile station apparatus according to the first embodiment.

FIG. 2 is a block diagram illustrating one example of a mobile station apparatus according to the first embodiment. In FIG. 2, the mobile station apparatus 50 includes a reception unit 51, a control unit 52, and a transmission unit 53.

The reception unit 51 performs reception processing on a signal that has been transmitted from the base station apparatus 10 and has been received via an antenna. A control signal and a data signal contained in a signal obtained by this reception processing are outputted to the control unit 52 and functional units for subsequent stages.

The control unit 52 extracts DRX parameters contained in the control signal, and identifies, based on the extracted DRX parameters, the timing at which to start and end On Duration. Further, the control unit 52 starts up the reception unit 51 and the transmission unit 53 at the timing at which to start On Duration. Further, the control unit 52 causes the reception unit 51 and the transmission unit 53 to enter the inactive state when the time period set in drx-Inactivity Timer is up, where drx-Inactivity Timer is reset each time data transmission or reception is performed during On Duration. However, upon receiving the DRX command contained in the control signal, the control unit 52 causes the reception unit 51 and the transmission unit 53 to enter the inactive state.

The transmission unit 53 transmits an uplink data signal, an uplink control signal, and an uplink reference signal to the base station apparatus 10.

Operation of Base Station Apparatus 10

Figure 3:
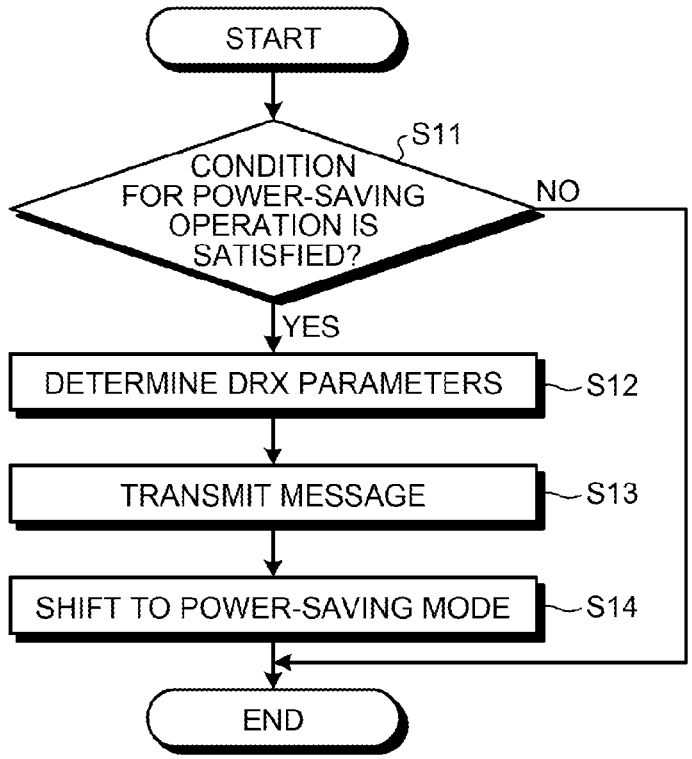
FIG. 3 is a flowchart illustrating one example of processing for operation of the base station apparatus according to the first embodiment.

Processing for operation of the base station apparatus having the above configuration is described here. FIG. 3 is a flowchart illustrating one example of processing for operation of the base station apparatus according to the first embodiment.

The control unit 30 determines whether the condition for the power-saving operation is satisfied (step S11).

Upon determining that the condition for the power-saving operation is satisfied (step S11: Yes), the control unit 30 determines DRX parameters (step S12). The DRX parameters are determined by use of, for example, a traffic volume. Specifically, when there is a low traffic volume, the control unit 30 sets a short time period in On Duration Timer. On the other hand, when there is a high traffic volume, the control unit 30 sets a long time period in On Duration Timer.

The control unit 30 transmits an RRC message containing the DRX parameters to the mobile station apparatus 50 via the transmitter-signal processing unit 23 and the radio apparatus 40 (step S13).

Figure 4:
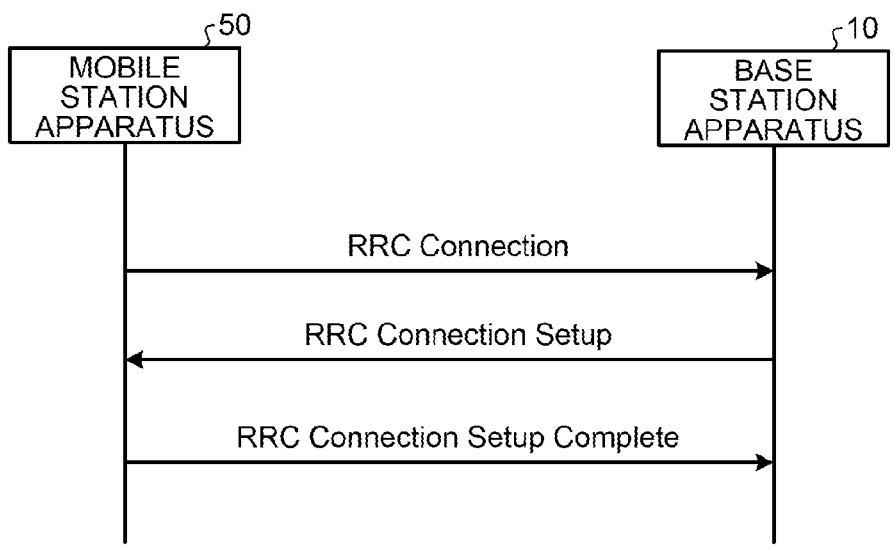
FIG. 4 is a sequence diagram for a new call.
Figure 5:
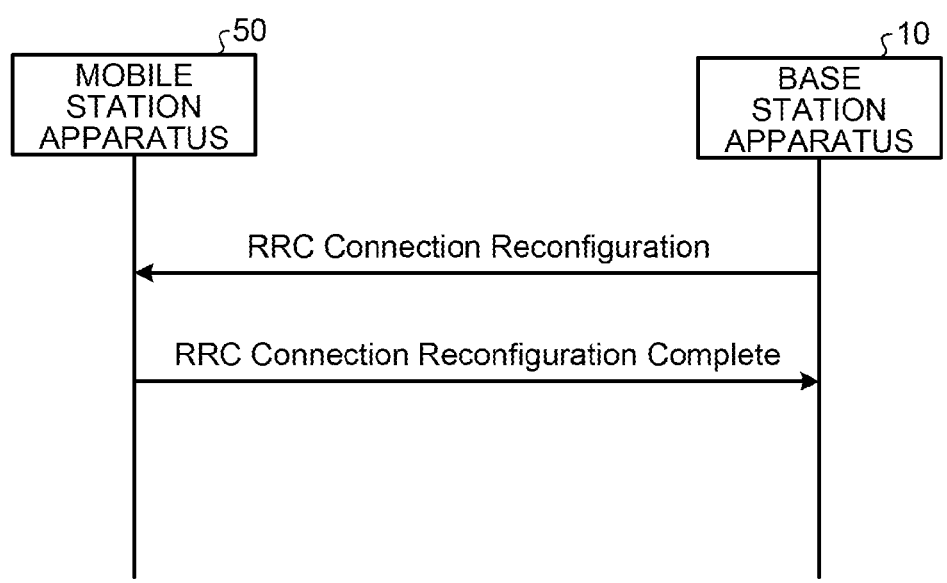
FIG. 5 is a sequence diagram for an ongoing call.

The RRC message containing the DRX parameters is different between when the massage is directed to the mobile station apparatus 50 that is newly starting communication, that is, directed to a new call, and when the massage is directed to the mobile station apparatus 50 that has already started communication, that is, directed to an ongoing call. FIG. 4 is a sequence diagram for a new call. FIG. 5 is a sequence diagram for an ongoing call.

As illustrated in FIG. 4, in the case of a new call, the mobile station apparatus 50 transmits an RRC Connection message to the base station apparatus 10 at the start. Then, the base station apparatus 10 determines DRX parameters, and then transmits an RRC Connection Setup message that contains the thus determined DRX parameters to the mobile station apparatus 50. Then, the mobile station apparatus 50 transmits an RRC Connection Setup Complete message to the base station apparatus 10.

On the other hand, as illustrated in FIG. 5, in the case of an ongoing call, the base station apparatus 10 determines DRX parameters, and then transmits an RRC Connection Reconfiguration message that contains the thus determined DRX parameters to the mobile station apparatus 50. Then, the mobile station apparatus 50 transmits an RRC Connection Reconfiguration Complete message to the base station apparatus 10.

The control unit 30 causes thereafter, the base station apparatus 10 to enter the power-saving mode (step S14).

Figure 6:
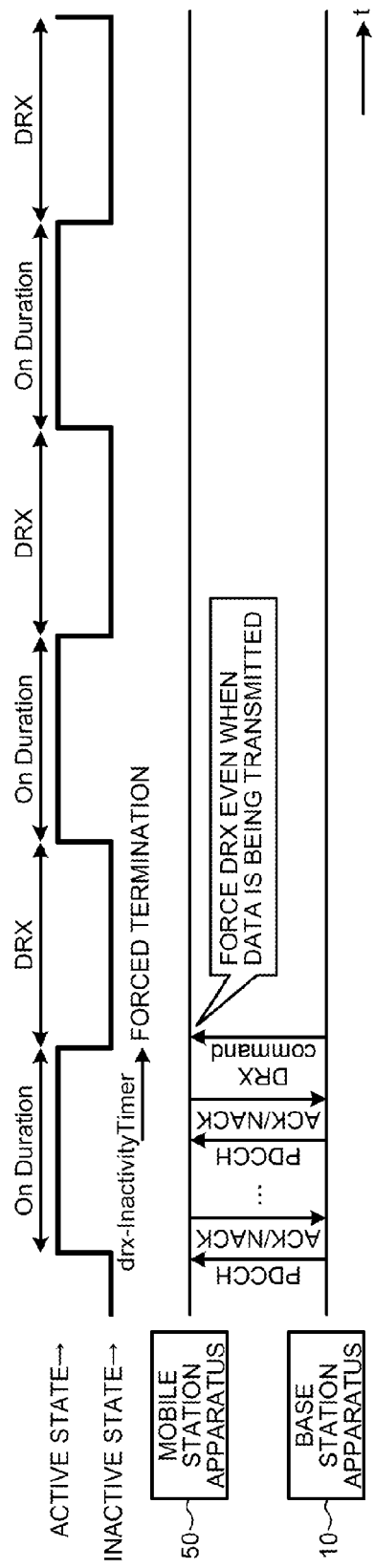
FIG. 6 is a diagram illustrating examples of the state of the mobile station apparatus according to the first embodiment and a status of signal transmission and reception between the mobile station apparatus and the base station apparatus.

FIG. 6 is a diagram illustrating examples of the state of the mobile station apparatus 50 according to the first embodiment and a status of signal transmission and reception between the mobile station apparatus and the base station apparatus.

The upper part of FIG. 6 illustrates the state of all of the multiple mobile station apparatuses 50 controlled by the base station apparatus 10. In the upper part of FIG. 6, the state of the mobile station apparatuses 50 shifts from the inactive state to the active state at the timing indicated by the DRX parameters. That is, On duration is started at this timing. Additionally, as illustrated in the lower part of FIG. 6, drx-Inactivity Timer is restarted, when data transmission or reception is performed during On Duration. Then, the base station apparatus 10 transmits the DRX command to all of the mobile station apparatuses 50 controlled thereby at the predetermined timing. All of the controlled mobile station apparatuses 50 are thereby forced to enter the inactive state.

As described above, according to this embodiment, the intermittent reception control apparatus 20 controls intermittent reception in communication between the base station apparatus 10 and each of the mobile station apparatuses 50. In addition, in the intermittent reception control apparatus 20, the control unit 30 generates DRX parameters, which are parameters defining intermittent reception, and transmits the thus generated DRX parameters to the multiple mobile station apparatuses 50. The DRX parameters contains information on the timing at which to cause the multiple mobile station apparatuses 50 to enter the active state where the mobile station apparatuses are enabled to receive signals transmitted by the base station apparatus 10. At the same time, the DRX parameters are common to all of the multiple mobile station apparatuses 50. Meanwhile, the scheduler 22 transmits to the multiple mobile station apparatuses 50 the DRX command, which is a control signal that operates to force shift to the inactive state.

This embodiment thus configured makes it possible to cause all of the controlled mobile station apparatuses 50 to shift from the inactive state to the active state at the same time. This makes it possible to extend the time period for which all of the controlled mobile station apparatuses 50 are in the inactive state. During the time period for which all of the controlled mobile station apparatuses 50 are in the inactive state, the base station apparatus 10 is allowed to enter the power-saving mode. As a result, it is made possible to extend the time period for which the base station apparatus 10 stays in the power-saving mode. Therefore, it is made possible to provide a high degree of effectiveness in saving power with the base station apparatus 10 and each of the multiple mobile station apparatuses 50 sharing the same DRX parameters, that is, with the base station apparatus 10 and the multiple mobile station apparatus 50 having been enabled to transmit and receive data therebetween.

[b] Second Emdodiment

A second embodiment relates to the timing at which to transmit DRX parameters. Note that the main configuration of a base station apparatus according to the second embodiment is the same as that of the base station apparatus 10 according to the first embodiment, and is described with the aid of FIG. 1.

In the base station apparatus 10 according to the second embodiment, the scheduler 22 outputs the issuing instruction to the MAC processing unit 28 at the same time as On Duration ends. This causes the DRX command to be transmitted from the MAC processing unit 28 to all of the mobile station apparatuses 50 controlled by the base station apparatus 10.

Further, the scheduler 22 performs scheduling on the basis of the amount of data retained in a data buffer (not illustrated) (hereinafter sometimes referred to simply as the "retained amount").

Specifically, the scheduler 22 schedules all of data that have been generated during the inactive state immediately prior to a first On Duration period and during the first On Duration period so as to be transmitted to the mobile station apparatuses 50 and that have been retained in the data buffer, basically for the first On Duration period. That is, when all of retained data are possible to be scheduled for the first On Duration period because the retained amount is less than a threshold, the scheduler 22 schedules all of retained data for the first On Duration period.

On the other hand, when not all of retained data are possible to be scheduled for the first On Duration period because the retained amount is not less than the threshold, the scheduler 22 schedules, for the first On Duration period, a portion of the retained data that is possible to be scheduled therefor. Then, the scheduler 22 schedules the remainder of the retained data for a second On Duration period that follows the first On Duration period.

Upon receiving the issuing instruction from the control unit 30, the MAC processing unit 28 issues the DRX command to all of the controlled mobile station apparatuses 50, and transmits the command thereto via the transmitter-signal processing unit 23. Here, because the issuing instruction is outputted by the scheduler 22 at the same time as On Duration ends, the DRX command is issued also at the same time as On Duration ends.

Figure 7:
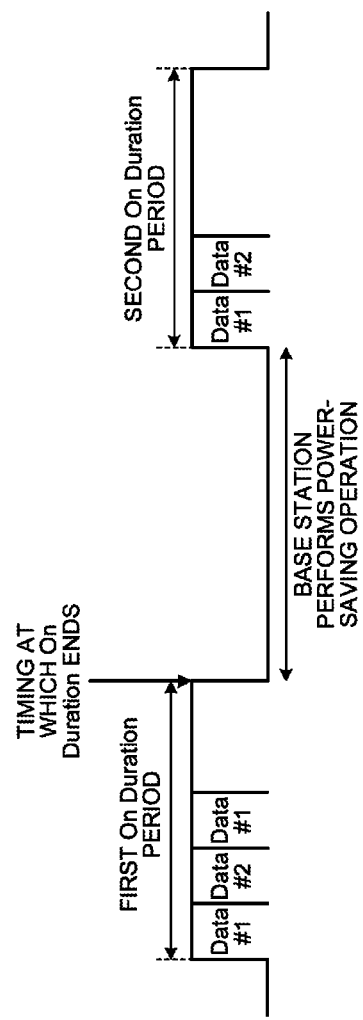
FIG. 7 is a diagram provided for explaining one example of processing for operation of a base station apparatus according to a second embodiment.
Figure 8:
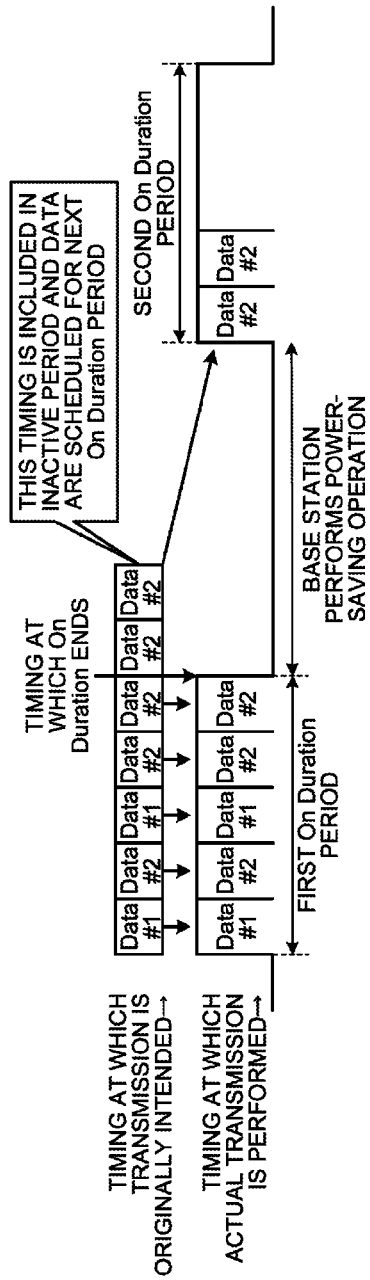
FIG. 8 is a diagram provided for explaining the example of processing for operation of the base station apparatus according to the second embodiment.

FIGS. 7 and 8 are diagrams provided for explaining one example of processing for operation of the base station apparatus 10 according to the second embodiment. In FIGS. 7 and 8, Data #1 is data addressed to UE #1, and Data #2 is data addressed to UE #2. Both of UE #1 and UE #2 are the controlled mobile station apparatuses 50. Here, it is assumed that the controlled mobile station apparatuses 50 are only UE #1 and UE #2.

As illustrated in FIG. 7, when the retained amount of data addressed to UE #1 and UE #2 is less than the threshold, the scheduler 22 schedules all of the data retained in the data buffer for the first On Duration period. The same applies to the second On Duration period.

On the other hand, as illustrated in FIG. 8, when the retained amount of data addressed to UE #1 and UE #2 is not less than the threshold, the scheduler 22 schedules, for the first On Duration period, a portion of the retained data that is possible to be scheduled therefor. Then, the scheduler 22 schedules the remainder of the retained data for the second On Duration period that follows the first On Duration period.

Here, the DRX command is transmitted at the same time as On Duration ends.

As described above, according to this embodiment, the scheduler 22 transmits the DRX command at the same time as On Duration ends.

This makes it possible to, even when data transmission or reception has occurred in On Duration, unfailingly set the state of each of the mobile station apparatuses 50 to the inactive state at the same time as On Duration ends.

Note that, although the above description assumes that the DRX command is transmitted, regardless of how large or small the retained amount may be, at the same time as On Duration ends, the embodiment is not limited to this. That is, to the mobile station apparatus 50 being such that the retained data addressed thereto is possible to be scheduled for the first On Duration period, the scheduler 22 transmits the DRX command at the same time as the first On Duration period ends. On the other hand, to the mobile station apparatus 50 being such that the retained data addressed thereto are impossible to be scheduled for the first On Duration period, the scheduler 22 transmits the DRX command at the same time as the retained data thereof is cleared.

Figure 9:
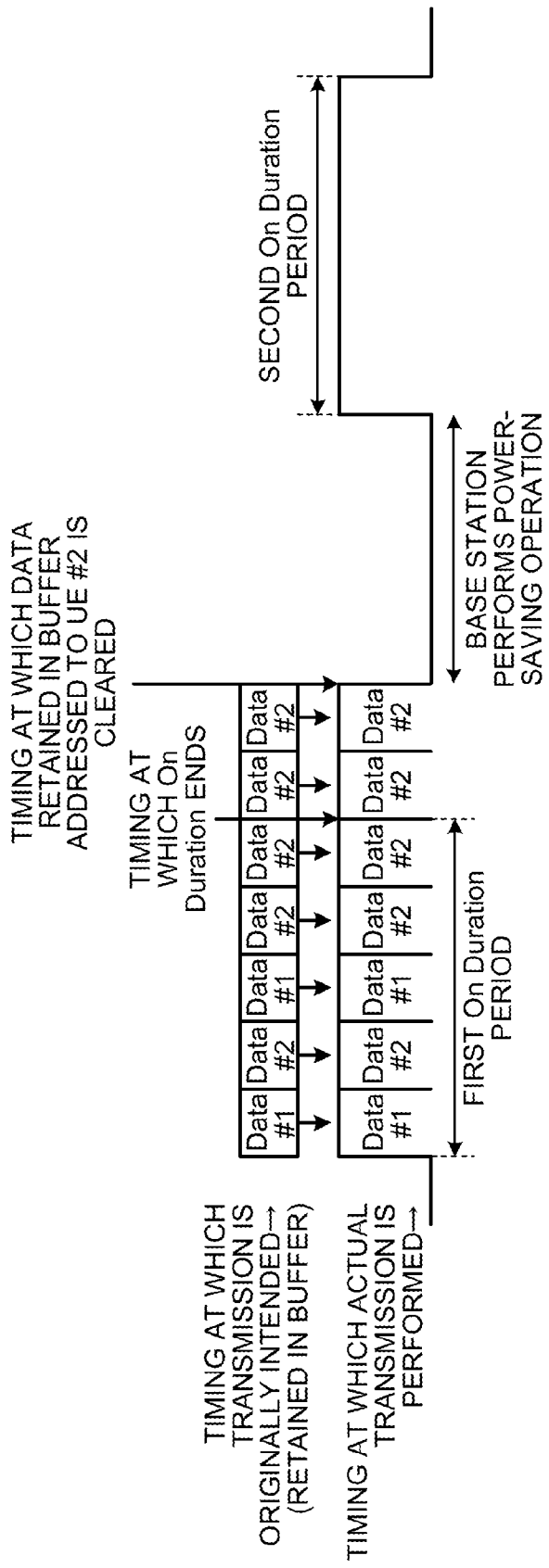
FIG. 9 is a diagram provided for explaining another example of processing for operation of the base station apparatus according to the second embodiment.

FIG. 9 is a diagram provided for explaining another example of processing for operation of the base station apparatus 10 according to the second embodiment. As illustrated in FIG. 9, the retained data addressed to UE #1 are possible to be scheduled for the first On Duration period. Therefore, the DRX command is transmitted to UE #1 at the same time as the first On Duration period ends.

On the other hand, the retained data addressed to UE #2 are not possible to be scheduled within the first On Duration period. Therefore, the DRX command is transmitted to UE #2 not at the same time as the first On Duration period ends but at the same time as the retained data thereof is cleared.

[c] Third Embodiment

A third embodiment relates to a variation of the power-saving mode. Note that the main configuration of a base station apparatus according to the third embodiment is the same as that of each of the base station apparatuses 10 according to the first and second embodiments, and is described with the aid of FIG. 1.

In the base station apparatus 10 according to the third embodiment, the scheduler 22 assigns resources provided with the same time period and different frequencies, to data addressed to the multiple mobile station apparatuses 50 to be transmitted in any On Duration period. That is, the scheduler 22 frequency-multiplexes data addressed to the multiple mobile station apparatuses 50 to be transmitted in any On Duration period. In this multiplexing, when a target transmission power level is not reached only with data addressed to some of the multiple mobile station apparatuses 50, data to be multiplexed is added until the target transmission power level is reached.

Note that the scheduler 22 schedules a reference signal to be transmitted at predetermined intervals of T1 in the inactive state, as in a conventional case. A manner in which this reference signal is transmitted is the same as that in a non power-saving mode.

Figure 10:
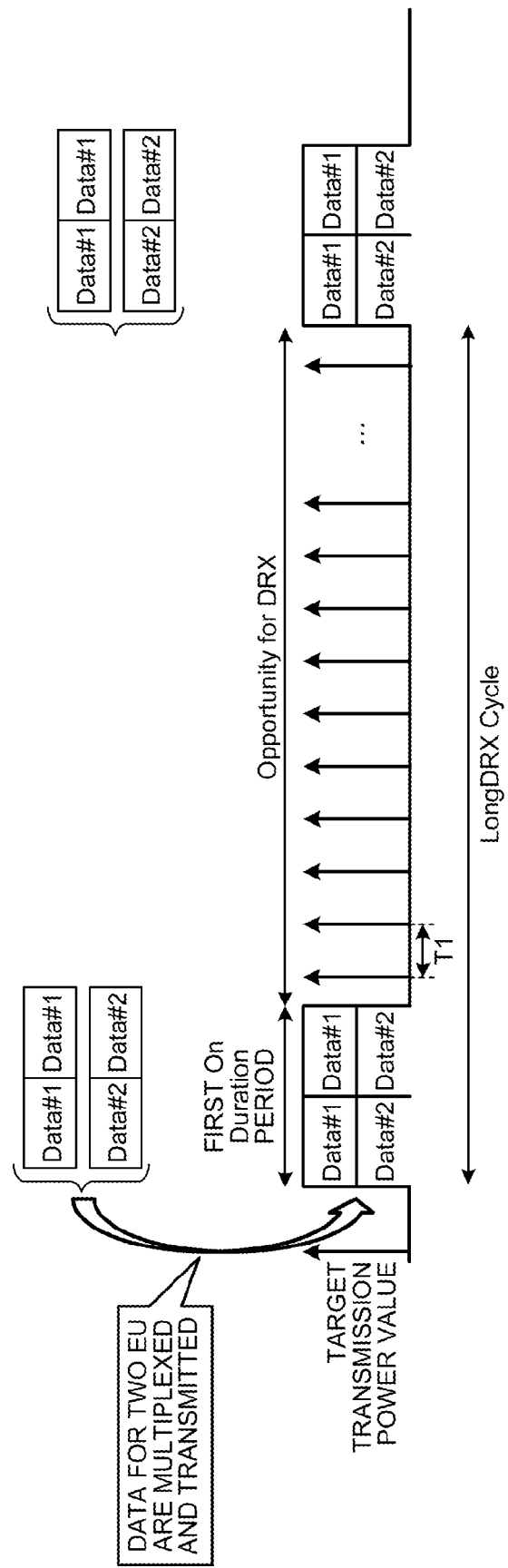
FIG. 10 is a diagram provided for explaining one example of processing for operation of a base station apparatus according to a third embodiment.

FIG. 10 is a diagram provided for explaining one example of processing for operation of the base station apparatus 10 according to the third embodiment. In FIG. 10, Data #1 is data addressed to UE #1, and Data #2 is data addressed to UE #2. Both of UE #1 and UE #2 are the controlled mobile station apparatuses 50. Here, it is assumed that the controlled mobile station apparatuses 50 are only UE #1 and UE #2.

As illustrated in FIG. 10, in a first On Duration period, a target transmission power value is not reached only with the data addressed to UE #1 or only with the data addressed to UE #2. In this case, the data addressed to UE #1 and the data addressed to UE #2 are frequency-multiplexed and transmitted. Note that the reference signal is transmitted at predetermined intervals of T1 in the inactive state, as in a conventional case.

As described above, according to this embodiment, in multiplexing data to be transmitted to the multiple mobile station apparatuses 50 in the power-saving mode, the scheduler 22 adds data to be multiplexed until the target transmission power level is reached.

This eliminates the need to perform, when the target transmission power level is not reached only with some of the mobile station apparatuses 50, such processing as insertion of null data until the target transmission power level is reached. Therefore, it is made possible to reduce wasted transmission power.

[d] Fourth Embodiment

A fourth embodiment relates to a variation of the power-saving mode. Note that the main configuration of a base station apparatus according to the fourth embodiment is the same as that of each of the base station apparatuses 10 according to the first to third embodiments, and is described with the aid of FIG. 1.

In the base station apparatus 10 according to the fourth embodiment, the scheduler 22 frequency-multiplexes data addressed to multiple mobile station apparatuses 50 to be transmitted to any On Duration period, as in the case of the third embodiment.

However, the scheduler 22 according to the fourth embodiment schedules the reference signal to be transmitted at predetermined intervals of T2 in the inactive state.

Figure 11:
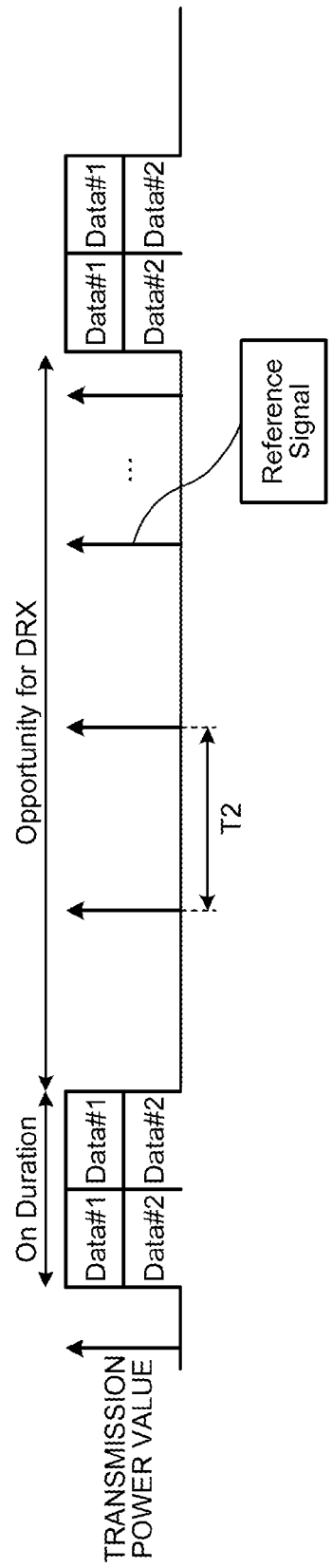
FIG. 11 is a diagram provided for explaining one example of processing for operation of a base station apparatus according to a fourth embodiment.

FIG. 11 is a diagram provided for explaining one example of processing for operation of the base station apparatus 10 according to the fourth embodiment. As illustrated in FIG. 11, the reference signal is transmitted at intervals of T2, which is larger than T1, in the inactive state. That is, the scheduler 22 according to the fourth embodiment thins out opportunities to transmit the reference signal.

As described above, according to this embodiment, the scheduler 22 transmits the reference signal at intervals of T2 in the inactive state, and the interval of T2 is longer than the interval of T1 in the non power-saving mode.

This enables reduction of the number of times the reference signal is transmitted, thereby making further power saving possible.

[e] Fifth Embodiment

A fifth embodiment relates to a variation of the power-saving mode. In the fifth embodiment, an amplifier is stopped during periods that are included in a period corresponding to the inactive state and that are other than periods corresponding to the timing at which to transmit the reference signal. Note that, as in the case of the fourth embodiment, opportunities to transmit the reference signal are thinned out also in the fifth embodiment.

Figure 12:
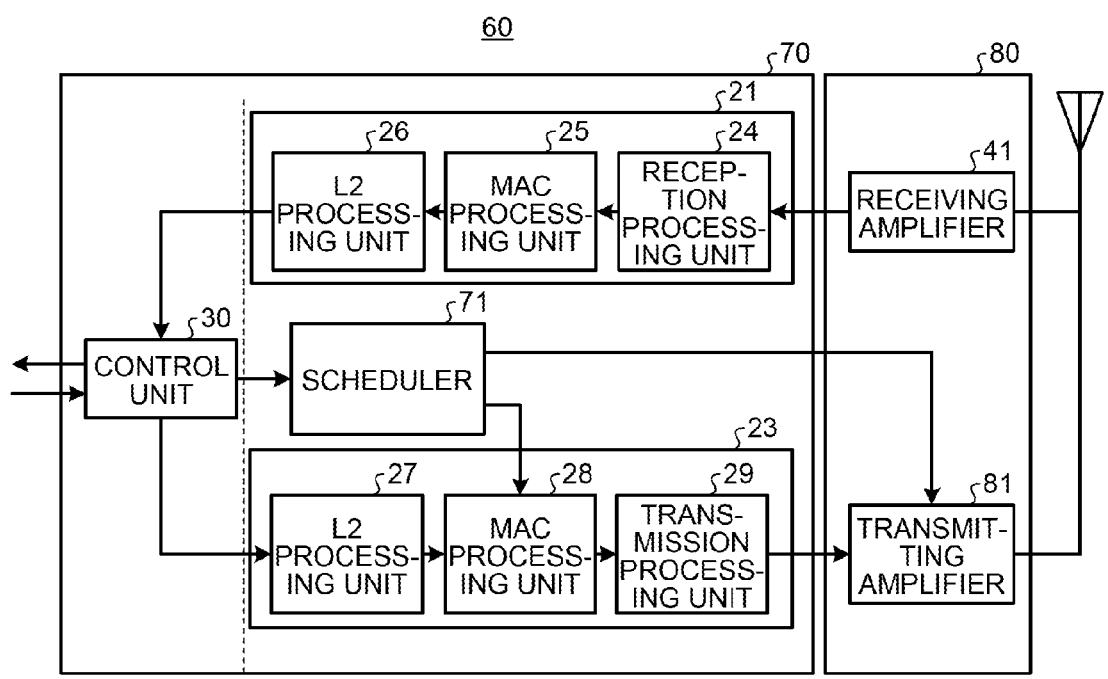
FIG. 12 is a block diagram illustrating one example of a base station apparatus according to a fifth embodiment.

FIG. 12 is a block diagram illustrating one example of a base station apparatus according to the fifth embodiment. In FIG. 12, a base station apparatus 60 includes an intermittent reception control apparatus 70 and a radio apparatus 80. The intermittent reception control apparatus 70 includes a scheduler 71. The radio apparatus 80 includes a transmitting amplifier 81.

The scheduler 71 basically has the same functions as the scheduler 22 in the fourth embodiment. Additionally, the scheduler 71 outputs a stop signal to the transmitting amplifier 81. This stop signal is a control signal that operates to stop the transmitting amplifier 81 during periods that are included in a period corresponding to the inactive state and that are other than periods corresponding to the timing at which to transmit the reference signal. That is, the stop signal indicates stoppage periods during which the transmitting amplifier 81 stops. In addition, each of the stoppage periods is included in a period corresponding to the inactive state and does not overlap the timing at which to transmit the reference signal.

Upon receiving the stop signal from the scheduler 71, the transmitting amplifier 81 stops during the stoppage periods indicated by the stop signal, and operates during periods other than the stoppage periods.

Figure 13:
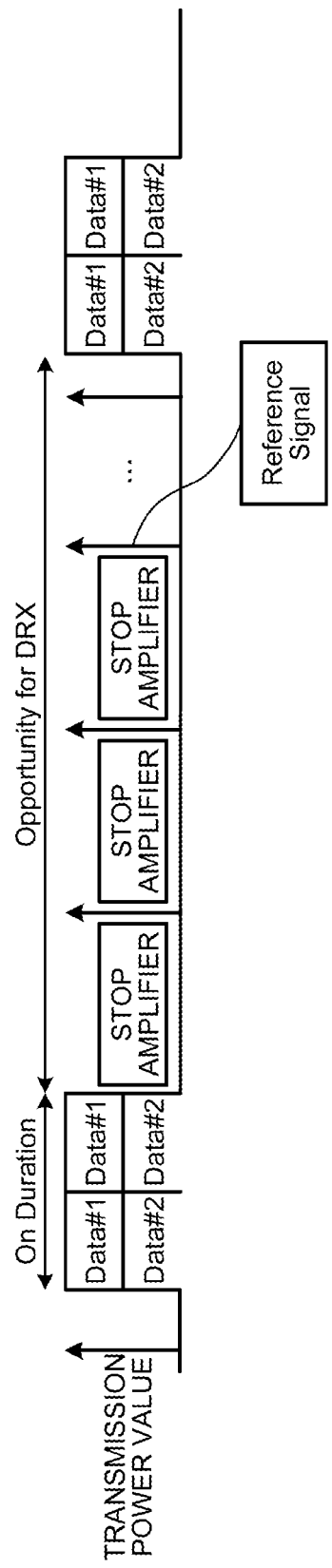
FIG. 13 is a diagram provided for explaining one example of processing for operation of the base station apparatus according to the fifth embodiment.

FIG. 13 is a diagram provided for explaining one example of processing for operation of the base station apparatus 10 according to the fifth embodiment. As illustrated in FIG. 13, the transmitting amplifier 81 is stopped during each period between two times at which to transmit the reference signal.

As described above, according to this embodiment, the scheduler 71 stops the transmitting amplifier 81 during periods that are included in a period corresponding to the inactive state and that are other than periods corresponding to times at which to transmit the reference signal.

This enables the transmitting amplifier to be stopped during periods when no transmitter signal is present, thereby making further power saving possible.

Other Embodiments (1) Although each of the third to fifth embodiments describes a case where a variation of the power-saving mode is carried out singly, the embodiments are not limited to this. For example, the control unit 30 estimates the fading frequency of each of the mobile station apparatuses 50 on the basis of a pilot signal transmitted from the mobile station apparatus 50, which is contained in a received signal received from the received-signal processing unit 21. This estimation of the fading frequency is carried out with respect to each of the mobile station apparatuses 50.

Then, the scheduler 71 switches, on the basis of the fading frequencies estimated by the control unit 30, the power-saving mode from one variation to another among the respective variations described in the third to fifth embodiments.

Specifically, when it is determined, on the basis of the fading frequencies estimated with respect to the controlled multiple mobile station apparatuses 50, that the number of the mobile station apparatuses 50 moving at high speed is larger than a predetermined criterion, the scheduler 71 executes the processing that corresponds to the power-saving mode described in the third embodiment.

Otherwise, when it is determined, on the basis of the fading frequencies estimated with respect to the controlled multiple mobile station apparatuses 50, that the number of the mobile station apparatuses 50 moving at high speed is smaller than a predetermined criterion, the scheduler 71 executes the processing that corresponds to the power-saving mode described in the fourth embodiment.

Otherwise, when it is determined, on the basis of the fading frequencies estimated with respect to the controlled multiple mobile station apparatuses 50, that the number of the mobile station apparatuses 50 moving at high speed is larger than a predetermined criterion, the following processing is executed provided that the mobile station apparatus is equipped with the transmitting amplifier 81 that performs ON/OFF operation at high speed. In this case, scheduler 71 executes the processing that corresponds to the power-saving mode described in the fifth embodiment.

(2) The intermittent reception control apparatus and the mobile station apparatus that are described in any one of the first to fifth embodiments may be implemented by the hardware configuration as follows.

Figure 14:
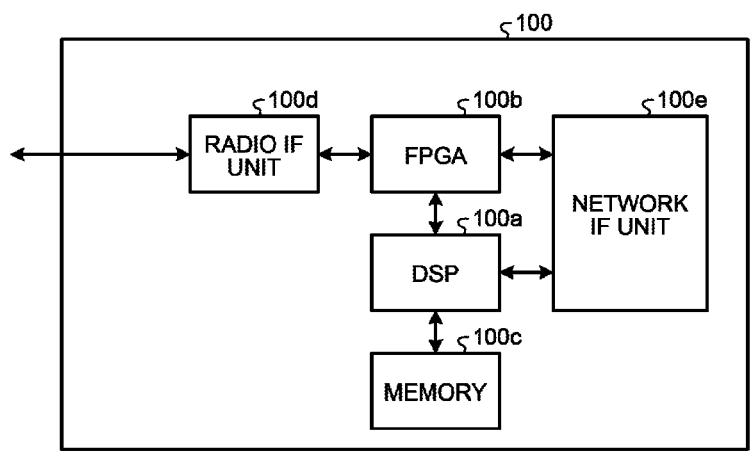
FIG. 14 is a diagram illustrating the hardware configuration of an intermittent reception control apparatus.

FIG. 14 is a diagram illustrating the hardware configuration of the intermittent reception control apparatus. As illustrated in FIG. 14, an intermittent reception control apparatus 100 includes, as hardware constituent elements, a DSP (Digital Signal Processor) 100a, an FPGA (Field Programmable Gate Array) 100b, a memory 100c, a radio IF (Inter Face) unit 100d, and a network IF (Inter Face) unit 100e. The DSP 100a and the FPGA 100b are connected to each other via the network IF unit 100e, such as a switch, so that input and output of various signals and data therebetween may be enabled. The radio IF unit 100d is an interface between the radio apparatus 40, or the radio apparatus 80, and the FPGA. The memory 100c is formed of, for example, RAM such as SDRAM (Synchronous Dynamic Random Access Memory), ROM (Read Only Memory), or flash memory. The control unit 30 and the baseband unit are implemented by, for example, integrated circuits such as the DSP 100a and the FPGA100b. The baseband unit includes the received-signal processing unit 21, the scheduler 22 or the scheduler 71, and the transmitter-signal processing unit 23.

Figure 15:
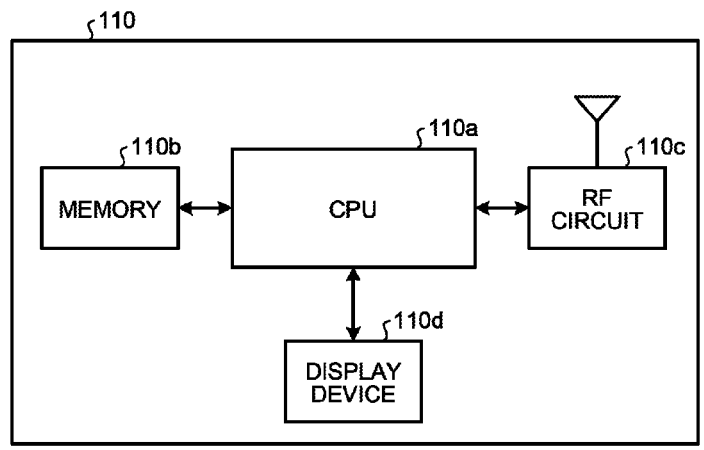
FIG. 15 is a diagram illustrating the hardware configuration of a mobile station apparatus.

FIG. 15 is a diagram illustrating the hardware configuration of the mobile station apparatus. As illustrated in FIG. 15, in terms of hardware, a mobile station apparatus 110 includes a CPU (Central Processing Unit) 110a, a memory 110b, an RF circuit 110c, which includes an antenna, and a display device 110d such as an LCD (Liquid Crystal Display). The memory 110b is formed of, for example, RAM such as SDRAM, ROM, or flash memory. The reception unit 51 and the transmission unit 53 are implemented by the RF circuit 110c. Additionally, the control unit 52 is implemented by an integrated circuit such as the CPU 110a.

Further, the various kinds of processing that are described in the first to fifth embodiments may be implemented by causing a computer to execute previously prepared programs. That is, programs corresponding to the respective parts of processing to be executed by the control unit 30 and the baseband unit may be recorded in the memory 100c, and the respective programs may be read out by the DSP 100a and the FPGA 100b to function as processes. Additionally, programs corresponding to the respective parts of processing to be executed by the control unit 52 may be recorded in the memory 100c, and the respective programs may be read out by the CPU 110a to function as processes.

The disclosed mode provides high effectiveness in saving power even when concerned mobile stations have been enabled to transmit and receive data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An intermittent reception control apparatus, which controls intermittent reception in communication between a first communication apparatus and a plurality of communication apparatuses, the intermittent reception control apparatus comprising:
   a control unit that generates intermittent reception parameters and transmits the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and
   a scheduler that schedules data signals to be transmitted and received to and from the plurality of communication apparatuses that are in an active state, and transmits to the plurality of communication apparatuses a control signal that operates to force the plurality of communication apparatuses to enter an inactive state, wherein:
   the intermittent reception parameters include parameters that defines a first period and a second period, the first period being a period during which the plurality of communication apparatuses have to monitor a control signal transmitted from the first communication apparatus to the plurality of communication apparatuses, the second period being a period when the plurality of communication apparatuses do not have to monitor the control signal; and
   the scheduler transmits the control signal at the same time as the first period ends.

2. An intermittent reception control apparatus, which controls intermittent reception in communication between a first communication apparatus and a plurality of communication apparatuses, the intermittent reception control apparatus comprising:
   a control unit that generates intermittent reception parameters and transmits the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and a scheduler that schedules data signals to be transmitted and received to and from the plurality of communication apparatuses that are in an active state, and transmits to the plurality of communication apparatuses a control signal that operates to force the plurality of communication apparatuses to enter an inactive state, wherein, when being in a power-saving mode, the scheduler multiplexes data signals to be transmitted to the plurality of communication apparatus, where data to be thus multiplexed is added until the target transmission power level is reached.

3. The intermittent reception control apparatus according to claim 2, wherein:

when being in the power-saving mode, the scheduler transmits a reference signal at first intervals when the plurality of communication apparatus are in the inactive state; and the first interval is longer than each of second intervals at which the reference signal is transmitted when the scheduler is in a non power-saving mode.

4. The intermittent reception control apparatus according to claim 3, wherein:

the first communication apparatus includes a transmission amplifier that amplifies the data signal and the control signal; and the scheduler stops the transmission amplifier during a period that is included in a period corresponding to the inactive state, and that does not include the timing at which to transmit the reference signal.

5. An intermittent reception control apparatus, which controls intermittent reception in communication between a first communication apparatus and a plurality of communication apparatuses, the intermittent reception control apparatus comprising:

a control unit that generates intermittent reception parameters and transmits the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and a scheduler that schedules data signals to be transmitted and received to and from the plurality of communication apparatuses that are in an active state, and transmits to the plurality of communication apparatuses a control signal that operates to force the plurality of communication apparatuses to enter an inactive state, wherein:

the control unit detects a retained amount of data signals addressed to each of the plurality of communication apparatuses;

on the basis of the retained amount thus detected, to any communication apparatus out of the plurality of communication apparatus that has data signals addressed thereto that are found possible to be scheduled for the first period the scheduler transmits the control signal at the same time as the first period ends, and, to any communication apparatus thereof that has data signals addressed thereto that are found impossible to be scheduled for the first period, the scheduler transmits the control signal when the retained amount of data signals addressed thereto is no longer detected.

6. A non-transitory computer-readable recording medium having stored therein a program for causing a computer to execute a process for controlling intermittent reception in communication between a first communication apparatus and a plurality of communication apparatuses, the process comprising:

generating intermittent reception parameters and transmitting the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and scheduling data signals to be transmitted and received to and from the plurality of communication apparatuses that are in an active state, and transmitting to the plurality of communication apparatuses a control signal that operates to force the plurality of communication apparatuses to enter an inactive state, wherein:

the intermittent reception parameters include parameters that defines a first period and a second period, the first period being a period during which the plurality of communication apparatuses have to monitor a control signal transmitted from the first communication apparatus to the plurality of communication apparatuses, the second period being a period when the plurality of communication apparatuses do not have to monitor the control signal; and the control signal is transmitted at the same time as the first period ends.

7. An intermittent reception control method for controlling intermittent reception in communication between a first communication apparatus and a plurality of communication apparatuses, the intermittent reception control method comprising:

generating intermittent reception parameters and transmitting the generated intermittent reception parameters to the plurality of communication apparatuses, the intermittent reception parameters including information on the timing at which to cause the plurality of communication apparatuses to enter an active state and being common to all of the plurality of communication apparatuses, the active state being a state where reception of signals transmitted from the first communication apparatus is enabled; and scheduling data signals to be transmitted and received to and from the plurality of communication apparatuses that are in an active state, and transmitting to the plurality of communication apparatuses a control signal that operates to force the plurality of communication apparatuses to enter an inactive state, wherein:

the intermittent reception parameters include parameters that defines a first period and a second period, the first period being a period during which the plurality of communication apparatuses have to monitor a control signal transmitted from the first communication apparatus to the plurality of communication apparatuses, the second period being a period when the plurality of communication apparatuses do not have to monitor the control signal; and the control signal is transmitted at the same time as the first period ends.

* * * * *